H. H. CROSIER.
ATTACHMENT FOR FISHING RODS.
APPLICATION FILED APR. 2, 1908.
911,117.
Patented Feb. 2, 1909.
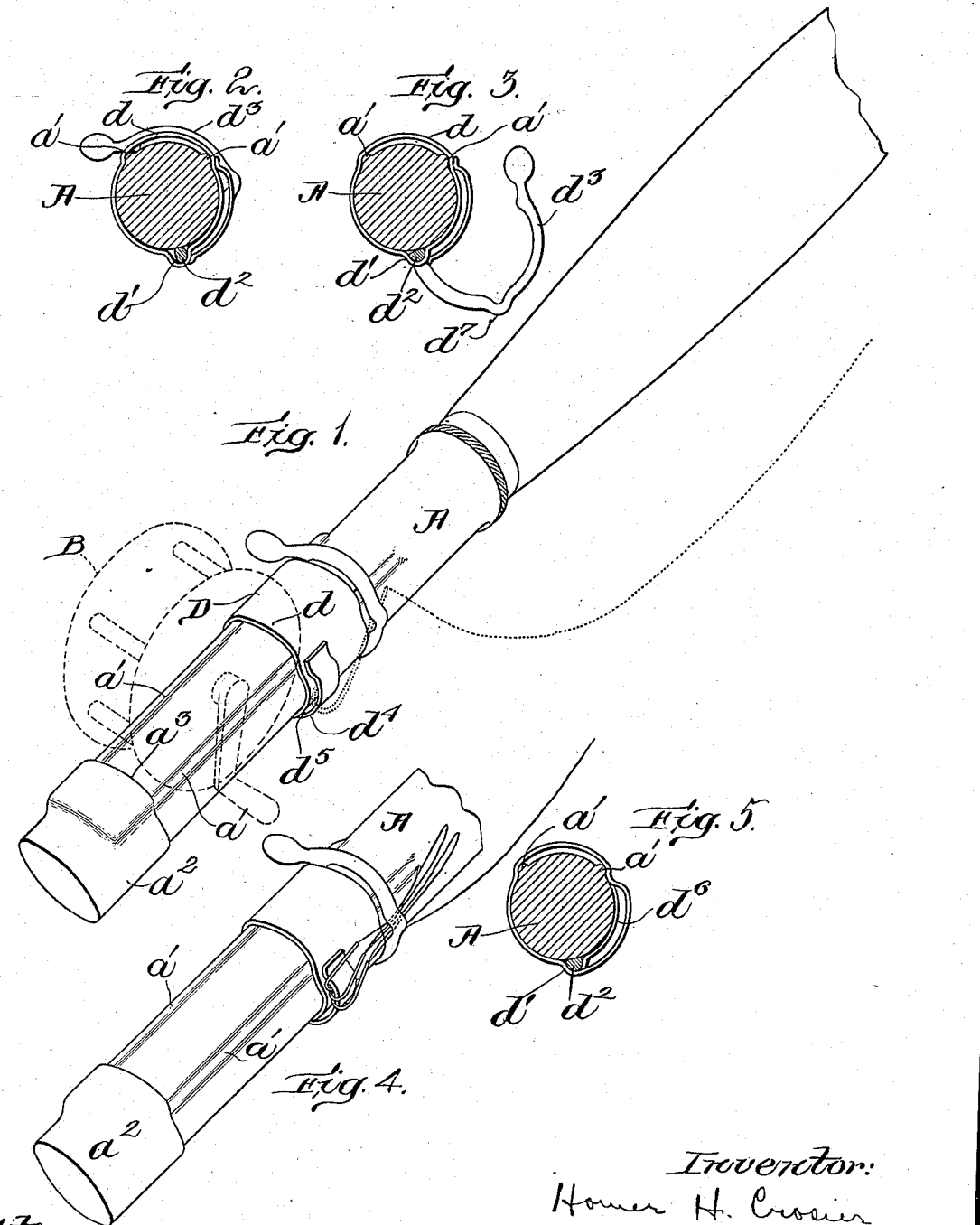

UNITED STATES PATENT OFFICE.

HOMER H. CROSIER, OF WEST BROOKFIELD, MASSACHUSETTS.

ATTACHMENT FOR FISHING-RODS.

No. 911,117.  Specification of Letters Patent.  Patented Feb. 2, 1909.

Application filed April 2, 1908. Serial No. 424,798.

*To all whom it may concern:*

Be it known that I, HOMER H. CROSIER, of West Brookfield, in the county of Worcester and State of Massachusetts, have invented a new and useful Attachment for Fishing-Rods, of which the following is a specification.

My invention relates especially to the reel of a fishing rod and its connection with the body of the rod.

The main object of my invention is to provide a covering for the end of the hook and my invention consists mainly in means to lock the reel band to the rod combined with a socket within which the end of the hook is retained by the locking means.

In the drawings Figure 1 is a perspective of a rod embodying my invention; Fig. 2 is a section at the left edge of the reel band looking away from the butt and showing the reel band locked; Fig. 3 is a similar section but showing the reel band unlocked; Fig. 4 is a view illustrating several hooks held by the locking means; and Fig. 5 is a section showing a modification hereinafter described.

Upon body portion A is slidably mounted the reel band D which is to hold the reel to the body portion. This portion A is provided with parallel ribs $a'$. At one end of portion A is butt-cap $a^2$ having socket $a^3$ in line with the said ribs. Reel B has a reel plate which is placed between said ribs and one end of the plate enters the socket $a^3$. The other end of the reel plate is held by reel band D. This reel band is substantially ring-shaped but is enlarged to form a hood $d$ which passes over the ribs and is of such size as to fit snugly over the ribs and thereby rotary movement of the reel band with relation to the body portion A is prevented. The reel band is bent outwardly at $d'$ to form a recess to receive cam $d^2$ and this cam is operated by arm $d^3$ in order to clamp the band to the body portion and prevent lengthwise movement. Attached to the reel band by soldering or otherwise is strap $d^4$ leaving a space or pocket $d^5$ between that strap and the band. In the form shown in Fig. 5 the reel band is itself struck up to form pocket $d^6$. The cam-operating arm is bent at $d^7$ to leave a space between the arm and the body portion of the rod for the purpose of clamping the hook or end of the line. It will be clear that in the form shown in Fig. 1 the shank of the hook is clamped while in Fig. 4 the leaders are clamped but in both cases the clamping is near the end of the line so that the hook cannot become free.

In using my invention the reel is placed upon the body portion with its plate between the ribs and with one end in the socket of the butt-cap. The reel band is then slipped along the support and receives within its hood the other end of the reel plate. The hood is then in such a rotative position with relation to the body portion that it receives and engages the ribs, and cannot rotate. When the reel band is in the desired position to hold the reel, and this desired position of the reel band lengthwise of the support will depend upon the thickness of the reel plate, the cam-operating arm is swung around the body portion and engages it with the result that the cam locks the band firmly to the body portion. In this way it will be clear that the band is held from rotary movement by the ribs and in its turn holds the reel from movement.

When it is desired to carry the rod through the woods or brush, or when it is to be hung lengthwise on the well-known hooks, it is very desirable that the hook at the end of the line be attached to the rod in such a way that its barb will not be exposed and in such a way that it will be firmly held in position, and I therefore unlock the band, put the end of the hook between the strap and band in the space which is provided, and the shank is placed against the body portion of the rod and the locking arm of the reel band is then brought in engagement with the body portion and clamps the shank of the hook between the body portion and the locking arm. In case the rod is a fly rod and several hooks are used, the barbs may be placed in the pocket as indicated, and the ends of the leaders clamped between the locking arm and the body portion of the rod.

One advantage of my invention is that the band may be used with any ordinary size of reel plate and yet be efficiently prevented from rotation. Other advantages are that the hook or end of the line is not only retained in its position, but the barb of the hook is kept covered. Another advantage is that the construction is very simple and compact and in no way interferes with the manipulation of the rod in fishing or with the throw in casting. My attachment is, furthermore, very inexpensive to manufacture and is of few and simple parts.

What I claim is:

1. An attachment for fishing rods comprising a reel band with a socket to receive the end of a hook; and means for locking the band to the body portion of the rod and retaining the end of the hook in the socket.

2. An attachment for fishing rods comprising a reel band with a socket to receive the end of a hook; means to lock the reel band to the body portion of the rod and including an operating arm which coöperates with the body portion of the rod to clamp the hook and thereby retain the end of the hook in the socket.

3. An attachment for fishing rods comprising a reel band with a socket to receive the end of a hook; and means for locking the band to the body portion of the rod, and clamping the shank of the hook to the body portion and thereby retain the end of the hook in the socket.

4. An attachment for fishing rods comprising a reel band with a socket to receive the end of a hook; and means to lock the reel band to the body portion of the rod, and including an operating arm for clamping the shank of the hook to the body portion of the rod and thereby retaining the end of the hook in the socket.

5. An attachment for fishing rods comprising a reel band to be mounted on the body portion of a fishing rod and having a socket to receive the end of a hook; and means for locking the reel band to the body portion including an arm with a recess within which the shank of the hook is clamped to retain the end of the hook in the socket.

HOMER H. CROSIER.

Witnesses:
M. G. HENNESSY,
G. A. ROCKWELL.